United States Patent [19]

Haaland

[11] 4,299,399
[45] Nov. 10, 1981

[54] GASKET OF RUBBER OR SIMILAR MATERIAL

[75] Inventor: Per Haaland, Oslo, Norway

[73] Assignee: A/S Den Norske Remfabrik, Norway

[21] Appl. No.: 87,846

[22] Filed: Oct. 24, 1979

[30] Foreign Application Priority Data

Oct. 27, 1978 [NO] Norway ................................ 783644
Apr. 27, 1979 [NO] Norway ................................ 791410

[51] Int. Cl.³ ............................................. F16J 15/10
[52] U.S. Cl. .............................. 277/207 A; 277/172; 277/215; 277/1; 285/230; 285/231; 285/345
[58] Field of Search ............... 285/DIG. 11, 110, 230, 285/231, 345; 277/207 R, 1, 34, 207 A, 208–210, 34.3, 168–172, 34.6, 190, 215, 186, 226, 205, 206 R; 251/214, 306

[56] References Cited

U.S. PATENT DOCUMENTS

| | | | |
|---|---|---|---|
| 3,386,745 | 6/1968 | Hein | 277/168 |
| 3,498,623 | 3/1970 | Rowe | 277/207 A X |
| 3,510,140 | 5/1970 | Hermann | 277/207 A X |
| 3,520,541 | 7/1970 | Rohani | 277/207 A X |
| 3,575,430 | 4/1971 | Alpine | 277/207 A X |
| 3,980,311 | 9/1976 | Ditcher | 285/231 X |
| 4,170,365 | 10/1979 | Haaland | 277/215 X |

FOREIGN PATENT DOCUMENTS

| | | | |
|---|---|---|---|
| 682728 | 3/1964 | Canada | 277/207 A |
| 2138502 | 2/1973 | Fed. Rep. of Germany | 277/207 A |
| 2165801 | 7/1973 | Fed. Rep. of Germany | 277/207 A |
| 511528 | 8/1939 | United Kingdom | 277/207 A |

*Primary Examiner*—Robert S. Ward, Jr.
*Attorney, Agent, or Firm*—William A. Drucker

[57] ABSTRACT

A gasket of elastic material, such as rubber or similar for use in forming a seal between respective sealing surfaces of two members to be joined, the sealing surfaces of the members being moved substantially parallel to each other during installation for squeezing the gasket therebetween. The gasket comprises in combination a major portion or core which due to the squeezing between the sealing surfaces effects a packing pressure, and a relatively thin gasket portion embracing the core so as to define a closed jacket around the core, said jacket being provided with a lubricant on the inside, and so as to transfer the movement taking place between the sealing surfaces via the jacket by the sliding thereof along the core. The jacket may be provided with intermediate portions, such as folds, undulations or corrugations which are stretched during installation for thereby increasing the sliding length of the jacket.

5 Claims, 12 Drawing Figures

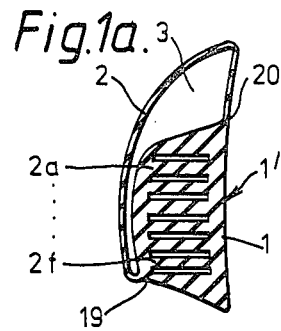
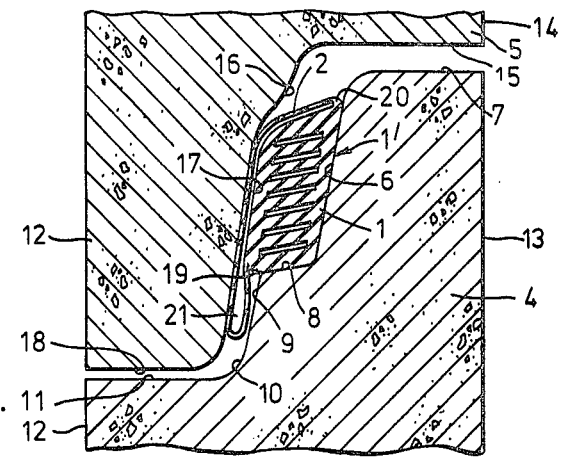
Fig.1a. Fig.1b.
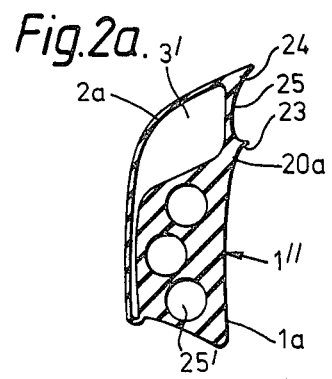
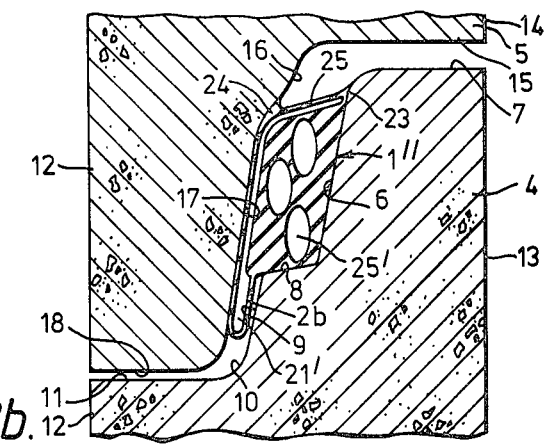
Fig.2a. Fig.2b.
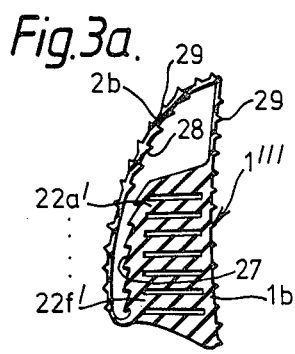
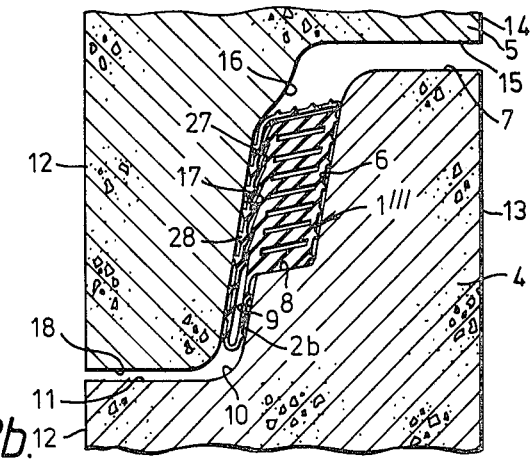
Fig.3a. Fig.3b.

GASKET OF RUBBER OR SIMILAR MATERIAL

BACKGROUND OF THE INVENTION

1. Field of the Art

The present invention relates to a gasket of elastic material, such as rubber or similar for use in forming a seal between respective sealing surfaces of two members to be joined, the gasket for installation purposes being attached to the sealing surface of one of the members, and the sealing surfaces of the members being moved substantially parallel to each other for squeezing the gasket therebetween.

In connection with the assembly of concrete basins and other pipe-shaped products which are to be sealed by a gasket of elastomeric material, it is necessary to cover the gasket or one of the sealing surfaces with a lubricant for reducing the friction between the gasket and the joint member. This is of special importance in the cases where limited forces are available for compression, or where tolerances in the joint members may easily lead to the occurrence of breakage therein due to too high gasket pressure. However, the friction between rubber and e.g. concrete is so high that such an installation nevertheless involves large difficulties.

2. Prior Art Statement

There are previously known several gasket constructions which can facilitate the installation, said gaskets offering a satisfactory sealing. In U.S. Patent Application Ser. No. 883,615 instructions are given for a gasket cross-section including a core which is constructed from closely arranged lamellae which during the installation are angularly shifted for thereby reducing the height of the gasket, the elasticity of the rubber urging to revert the lamellae to their original position for thereby effecting the necessary packing pressure. In connection with fairly smooth sealing surfaces such a known gasket functions satisfactorily. If the sealing surfaces have, to the contrary, a very rough surface, it is very difficult to have the sealing surfaces slide along the rubber gasket.

Further, there are known structures seeking to eliminate the sliding between concrete and rubber, and for example in U.S. Pat. No. 3,510,140 there is suggested a gasket in which portions of the gasket profile during the installation is folded, a lubricant being provided between the folded portions. During installation the sliding will take place between the rubber surfaces of the gasket rather than between rubber and concrete. Such a known gasket structure functions fairly satisfactorily. but it suffers from the disadvantage that the lubricant may be applied immediately prior to the installation, the lubricant otherwise being apt to easily disappear during storage as well as being easily contaminated on site.

In addition, although such a known gasket offers a relatively easy installation of the members to be joined, it suffers from the disadvantage that the finished installed members may easily be separated since the gasket hardly offers any resistance when the joint members are influenced by forces seaking to urge them apart.

In SE-PS No. 78 00282-1 there is disclosed embodiments of sealing rings comprising a substantially triangular main portion and a relatively thin portion which from a point of connection extends across a conical sliding surface on the triangular main portion. Such a triangular main portion having a conical sliding surface is unfavourable in connection with joints which are to adopt large pressures, since only a minor portion of the core of the gasket will be utilized for sealing purposes in its final mounted position. Further, the patent specification only discloses embodiments in which a covering portion extends from the triangular core portion and together therewith define a pocket open in the longitudinal direction, a fact which includes that a predisposed lubricant will easily disappear due to evaporation or washing off if the gasket is not transported and stored with a special packaging.

SUMMARY OF THE INVENTION

The object of the present invention is to give instructions for a gasket which does not suffer from the above-mentioned disadvantages. More particularly, the invention provides a gasket having such a structure that the applied lubricant is not subjected to contamination, the lubricant not being able to disappear by evaporation or otherwise.

The object is achieved in a gasket of the type stated in the preamble, which according to the present invention is characterized in that the gasket in combination comprises a major portion or core adapted so as to be deformed during the installation movement, the elasticity of the core material seeking to revert the core to its original position for thereby effecting a packing pressure, and a relatively thin gasket portion which defines a closed jacket outside the very core, and the inner surface of which is provided with a lubricant for during the installation whilst sliding along the core, serving as a friction reducing sliding jacket between the core and the sealing surface which is displaced relative to the core.

Hereby is achieved a gasket which in advance has been provided with a lubricant, said lubricant being sufficiently covered to avoid the collection of dust and dirt on the sliding surfaces of the gasket. Further the closed sliding jacket will involve a complete sealing off of the gasket portions provided with a lubricant, thus avoiding evaporation or washing away of the lubricant and a pollution of the environment thereby.

The thin sliding jacket may embrace a larger or lesser portion of the core of the gasket, but it must be so dimensioned that the total installation movement between the inner and the outer sealing surface is transferred via the sliding jacket. If the total inner surface of the sliding jacket as well as the portion of the core embraced by the jacket is provided with a lubricant, the installation friction may be very low.

A further development according to the invention is to the effect that the closed jacket at the one end of the core is provided with one or more intermediate portions disposed between the core and the remaining jacket, and/or between remaining jacket portions.

Such a jacket is especially favourable in those cases in which a long relative movement between the members to be joined will occur during the installation. In connection with suitable embodiments of the intermediate portions the sliding length of the jacket can be increased considerably.

Suitably portions of the sliding jacket may be implemented as folds, foldings or similar, which during the installation of the members to be joined, are pulled ahead continuously in the direction of the installation.

However, it is to be understood that an intermediate jacket portion can also be arranged in an inclined relation to the core or a portion thereof. In that case the core will also be provided with a sloped surface, but this surface will not define a sliding surface, but in contrary a braking surface, the intermediate portion during installation being adapted to roll off the core. However, the remaining portion of the jacket will during installation define a friction reducing means between the core and the sealing surface which is moved relative to the gasket core.

To achieve a braking effect between an intermediate jacket portion and the core the respective abutting surfaces can be provided with furrows engaging each other.

The intermediate jacket portion may have the same thickness as the remaining sliding jacket, but in many cases when the gasket is in its final installed position, it is desirable to have a higher gasket compression pressure than the compression pressure which the gasket should offer during the displacement of the members to be joined, and especially at the start of the installation. In such cases the intermediate jacket portion and the passage from the core to the sliding jacket may be designed with a larger thickness than the remaining sliding jacket, preferably a thickness which increases towards the attachment point of the core portion.

During the last part of the assembly of the pipes or the joint members the thicker portion will be pulled in between the core portion and the opposite sealing surface, so that the active sealing volume of the gasket will increase.

An embodiment of an intermediate jacket portion may be to the effect that it together with the adjoining core portion define a drop-shaped track. When the members to be joined are brought in position and the sliding jacket is displaced to its final position, the drop-shaped track will form a concave gasket end surface aiding in a further sealing effect between the joint members when a fluidum pressure influences the said end surfaces.

It is to be understood that the sliding jacket may be attached to the core either by being formed integrally with the jacket for example by extrusion or moulding, or by other suitable attachment methods. For example, the jacket may at one attachment point be formed integrally with the core, whereas at a second attachment point it may be glued or welded to the core. Possibly the jacket may be attached to the core by a snap lock formed for example by opposite dovetail slot and dovetail means, etc.

The gasket according to the invention may easily be manufactured by extruding long strings to be cut in suitable lengths and thereafter possibly welded or vulcanized at the ends thereof for forming suitably sized rings. Possibly the gasket may be moulded in forms. The method of manufacturing the gasket depends on the structure of the gasket as well as the shape of the outer sliding jacket.

The gasket according to the invention may be used in all joints wherein the sealing surfaces are to be displaced substantially parallel to each other. Aside from having an annular shape the gasket may also be used in arbitrarily cut lengths, for example as hatchway gaskets.

In the following the invention will be further described, reference being had to the drawing, which illustrates various embodiments of the gasket according to the invention.

BRIEF DESCRIPTION OF THE DRAWINGS

FIG. 1a illustrates a cross-section through a first embodiment of the gasket according to the invention.

FIG. 1b illustrates a cross-section through the gasket of FIG. 1a in installed position.

FIG. 2a illustrates a section through a second embodiment of the gasket according to the invention.

FIG. 2b illustrates a section through the gasket of FIG. 2a in installed position.

FIG. 3a illustrates a section through a third embodiment of the gasket according to the invention.

FIG. 3b illustrates the gasket of FIG. 3a in installed position.

DESCRIPTION OF PREFERRED EMBODIMENTS

In FIG. 1a, which is a section through a first embodiment of the gasket according to the invention, 1' designates the very gasket, and 1 the major portion or core of the gasket, whereas 2 designates a thin gasket portion defining a closed jacket outside the very core 1. Together with the core 1 the jacket 2 define a hollow chamber 3, the walls of which are coated with a lubricant, so that the sliding jacket 2 during installation of the joint members to be sealed by the gasket, may easily slide along the core 1 and thus facilitate the movement between the sealing surfaces of the joint members.

Figure 4:
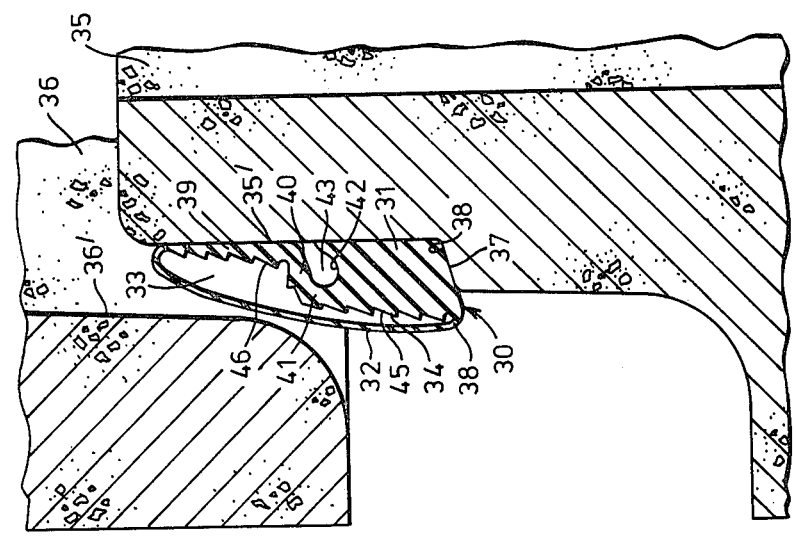
FIG. 4 illustrates a cross-section through another embodiment of the gasket according to the invention, provided on the spigot end of a joint member.

In FIG. 1b, 4 designates a segment of a cross-section through the spigot end of a first pipe- or ring-shaped joint member, whereas 5 designates a segment of a section through the socket end of a second pipe- or ring-shaped joint member to be put down onto the joint member 4. The spigot end or the joint member 4, which for example may be a concrete pipe, a basin ring or similar, is provided with a vertical sealing portion or sealing surface 6, which at the top merges into a horizontal abutment surface 7, and which at the bottom via a step 8 merges into an intermediate portion 9 having a somewhat larger diameter than the portion 4. Via a curved transition portion 10 the intermediate portion 9 merges into a substantially horizontal abutment portion 11, which along its peripheral edge joins the outer wall 12 of the spigot end. In FIG. 1b, 13 designates the inner wall of the joint member 4.

The second joint member 5, which for example may be a concrete pipe having a socket end to be fitted onto the spigot end of the joint member 4, comprises an outer wall 12 and an inner wall 14. At its lower end the latter merges into a first horizontal abutment portion 15 which via a curved transition portion 16 merges into a vertical sliding portion 17, which in turn merges into a second horizontal abutment portion 18. This, in turn, merges into the outer edge of the above-mentioned outer wall 12.

The gasket 1' which is illustrated in dismounted position in FIG. 1a, is threaded onto the area of the vertical sealing portion 6 and the step 8 of the spigot end 4. The gasket core 1 is of a larger thickness than the gap to be sealed, i.e. the gap between the sealing surfaces 6 and 7 on the spigot end 4 and the socket end 5, respectively, so that in mounted position, i.e. with the socket end 5 threaded onto the spigot end 4, the gasket will be in a compressed position between the sealing surfaces 6, 17. Because a sliding jacket 2 has been provided on the outside of the core 1, the movement between the inner and the outer sealing surface 6 and 7, respectively, will be transferred via the jacket 2, so that the sliding will take place between the sliding jacket 2 and the core 1. The total inner surface of the sliding jacket 2 and the portion of the core 1 which it embraces, is coated with a cover of lubricant, so that the friction during installation will be very small.

In FIG. 1a, which illustrates a first embodiment of the gasket according to the invention, the sliding jacket 2 embraces a larger portion of the core 1 of the gasket, said jacket from a first corner 19 of the core extending therealong to a second corner 20 disposed approximately diametrically opposite to the first corner 19. In the unmounted position of the gasket 1', the sliding jacket 2 protrudes only a minor distance from the first core corner 19, whereas from the second corner 20 it protrudes a distance corresponding to the thickness of the core. Thus, the length of the sliding jacket 2 will be large enough to follow the relative movement between the spigot end 4 and the socket end 5 when these are put in position during the installation procedure. As illustrated in FIG. 1b, the sliding jacket 2 have, subsequent to the completion of the installation, slid along the gasket core 1 in such a manner that it will then be in contact with the gasket core 1 at the corner 20, whereas at the second corner 19 it will form a surplus narrow hollow chamber 21.

Besides, the gasket core 1 of the gasket illustrated in FIGS. 1a and 1b, is provided with a series of parallel lamellae 22a–22f, which during installation are angularly shifted so that the thickness of the gasket core 1 is reduced. The intrinsic stiffness of the material of the gasket will, however, induce a return resiliency of the lameallae 20a–20f, whereby the thickness of the gasket and thereby the packing pressure will be apt to increase.

It is to be understood that the relation between width and thickness of the lamellae may be varied within wide limits, so that the resilient characteristic of the gasket during the installation and the final packing pressure may be varied accordingly.

An advantage of the gasket structure illustrated in FIGS. 1a and 1b is to the effect that due to the skew angle which the lamellae 22a–22f taken in their installed position, there is obtained a large locking force between the spigot end 4 and the socket end 5, because the lamellae have to be clenched or deformed before turning over their neutral position. This force is much larger than the force necessary for deflecting the lamellae during installation.

This condition also influences the packing characteristics of the gasket, since an inner or outer pressure will influence the surfaces 7, 15 and 11, 18, respectively. If these surfaces are shifted apart as a result of the pressure, the lamellae 22a–22f will be clenched, a fact which involves that the packing pressure will increase.

In FIGS. 2a and 2b there is illustrated a second embodiment of the gasket according to the invention, and this gasket which is generally designated by 1", is provided with a gasket core 1a having an outer cross-sectional shape corresponding to the core 1 of FIG. 1a and having a sliding jacket 2a substantially corresponding to the jacket 2 of FIG. 1a. Differently from the gasket of FIGS. 1a and 1b the sliding jacket 2a of FIGS. 2a and 2b is provided with two ridges 23, 24 on the jacket portion 25 extending from the corner 20a. In the mounted position of the gasket 1", as this is illustrated in FIG. 2b, the two ridges 23, 24 define an extra lip tightening against the sealing surfaces 6 and 17 of the spigot end 4 and the socket end 5, respectively. In this case the core 1a is provided with a plurality of circular channels 25' extending in the longitudinal direction of the jacket and making the gasket easily compressable during installation. After installation the circular channels 25' take an oval-shaped form, as this appears from FIG. 2b. Also in the embodiment illustrated in FIGS. 2a and 2b the sliding jacket 2b will transfer the relative movement between the socket part 5 and the gasket core 1a on the spigot end 4, said jacket in the final mounted position defining a narrow, hollow chamber 21' on the opposite side of the hollow chamber 3' defined thereby prior to the installation.

The gasket 1" has favourable sealing properties because it resides compressed between the two sealing surfaces 6 and 17, the concave jacket portions 25 between the ridges 23, 24 inducing increased sealing effect as regards the inner pressure in the spigot member 4 and the socket member 5. An inner pressure which is effective in the area of the curved end surface brought about by the jacket portion 25, will press the ridges firmly against the sealing surfaces, and the larger the inner pressure is, the stronger the lip portions or ridges 23, 24 will be pressed against the mentioned sealing surfaces.

In FIGS. 3a and 3b variants of the gasket discussed in connection with FIGS. 1a and 1b are illustrated. In FIG. 3a where the very gasket is designated by 1''', it comprises a core 1b having a series of parallel lamellae 22a'–22f', as well as a sliding jacket 2b having a basic shape corresponding to that illustrated in FIG. 1a. In order to increase the locking effect of the gasket in mounted position, the core 1b and the sliding jacket 2b are provided with saw-toothed furrows 27 and 28, respectively, which slide past each other in the installation direction, but effect a locking for the return movement. In FIG. 3b there is illustrated how the saw-toothed furrows 27 and 28 are in engagement with each other in the mounted position of the gasket 1'''.

For better filling of the pores and scratchings of the sealing surfaces the gasket according to the invention may on the outside be provided with longitudinally extending thin ribs 29, which penetrate into the irregularities of the sealing surfaces 6 and 17 of the spigot member 4 and the socket member 5, respectively. In FIG. 3b the longitudinally extending ribs 29 have been deleted for the sake of survey.

In FIG. 4, which is a section through another embodiment of the gasket according to the invention, 30 designates the very gasket and 31 the main portion or core of the gasket, which may be manufactured from a compact, but elastic material, as this is illustrated in FIG. 4, but which, of course, may be manufactured in different ways, for example with longitudinally extending channels or slits. Around the main portion or the core 31 there is provided a gasket portion 32 which compared to the core is a thin portion and defines a closed jacket outside the very core 31. Together with the core 31 the gasket portion or jacket 32 define a hollow chamber 33, the walls of which are covered with a lubricant, so that the sliding jacket 32 during the installation of the joint members to be sealed by the gasket 30, may easily slide along a substantially vertical or weakly curved portion 34 of the core 31.

In FIG. 4 there is illustrated a fraction of the spigot end of a first pipe- or ring-shaped joint member 35 on which the gasket 30 is disposed. In FIG. 4 there is further illustrated a fraction of a section through the socket end of a second pipe- or ring-shaped joint member 36 which is to be put down on the joint member 35.

Prior to the assembly of the joint members 35 and 36, the gasket 30 is threaded onto the spigot end of the joint member 35, the lower end surface 37 of the gasket resting on a step 38 provided on the spigot end of the joint member 35.

The gasket core 31 has a larger thickness than the gap to be sealed, i.e. the gap between the sealing surfaces 35', 36' of the spigot end member 35 and the socket end member 36, respectively, so as to be resting compressed between the sealing surfaces in assembled position, i.e. with the socket member 36 threaded onto the spigot member 35. Because of the sliding jacket 32 provided on the outside of the core 31, the movement between the sealing surfaces of the joint members will be transferred via the jacket 32, so that the sliding will take place between the sliding jacket 32 and the core 31. The total inner surface of the sliding jacket 32 and the portion of the core 31 embraced thereby, may then be provided with a coat of lubricant, so that the friction during installation will be very small.

In FIG. 4, which illustrates a special embodiment of the gasket according to the invention, the sliding jacket 32 embraces a larger part of the core 31 of the gasket, said jacket from a first corner 38 of the core 31 extending therealong and therebeyond for at the top to join a somewhat stiffer jacket portion 39 which is in contact with the sealing surface 35' of the joint member 35. At its lower end the jacket portion 39 merges into an intermediate jacket portion 40, i.e. a portion located between the core 31 and remaining jacket portions.

As illustrated in FIG. 4 the intermediate portion 40 is via an attachment point 41 attached to the core 31 at that side which is opposite to the joint member 35, so that the intermediate portion during installation of the two members 35 and 36, respectively, is turned about the attachment point 41 for thereby forming an extension of the jacket 32 in the direction of the installation.

This extension of the sliding jacket is particularly favourable in those cases where joint members which must be moved a long distance relative to each other during the assembly operation, are used. The intermediate portion of the sliding jacket will then be able to increase the movement of the sliding jacket in the direction of the installation, a distance corresponding approximately to twice the thickness of the gasket core, but this increase is of course depending on how the intermediate portion is designed and the shape of the core in other respects.

Possibly, the intermediate portion or portions may be designed with an undulated, folded or corrugated form which is stretched or extended during the installation movement. However, it is to be observed that the intermediate portions should not give the very gasket a shape which may be unstable when being put in position on one of the joint members, i.e. it is to be aimed for attaining a displacement of the sliding jacket which gives a continuous pulling thereof in the direction of the installation.

Figure 5:
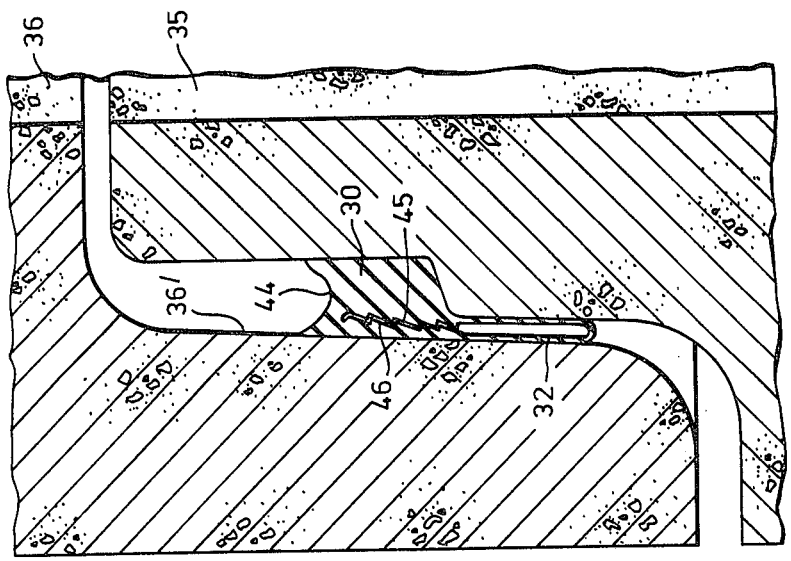
FIG. 5 is a section similar to FIG. 4 and illustrates the gasket with assembled joint members.

The intermediate portion 40 defines together with the top portion 42 of the core 31 an approximately drop-shaped track 43. When the members 35, 36 which are to be joined, have been brought in position as this is illustrated in FIG. 5 and the sliding jacket 32 has been displaced to its final position, this track will form a concave gasket end surface 44 aiding in a further sealing effect between the joint members when a fluidum pressure influences said surface.

To increase the locking effect of the gasket in the assembled position thereof the portion 34 of the core 31 as well as the jacket portion 39 are provided with sawtoothed furrows 45 and 46, respectively, which slide over each other in the direction of the installation, but have a locking effect in the opposite direction. In FIG. 5 it is illustrated how the saw-toothed furrows 45 and 46 will come into engagement with each other in the assembled position of the gasket 30.

To improve the filling of pores and scratchings in the sealing surfaces the gasket according to the invention may on the outside be provided with longitudinal thin ribs penetrating into the cavities of the sealing surfaces of the spigot member 35 and the socket member 36, respectively. In FIGS. 4 and 5 such longitudinal outside ribs are deleted for the sake of survey.

Figure 6:
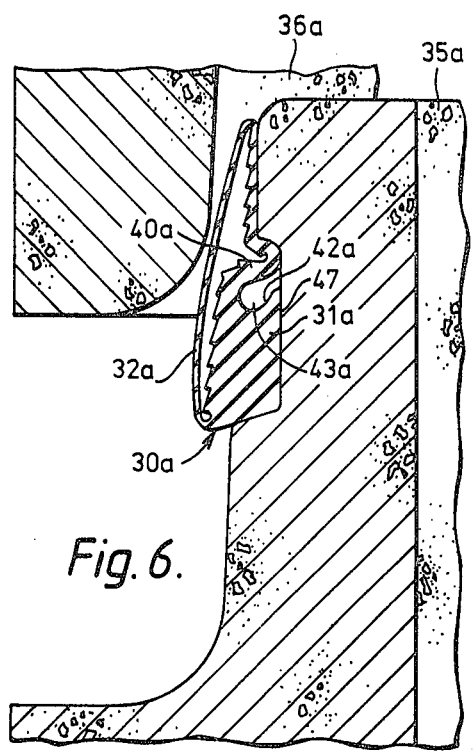
FIG. 6 is a cross-section through a variant of the embodiment illustrated in FIGS. 4 and 5, provided in a slot in the spigot end of a joint member.

In FIG. 6 there is illustrated a variant of the gasket discussed in connection with FIGS. 4 and 5, the gasket 30a in FIG. 6 differing from the gasket according to FIGS. 4 and 5 by an intermediate jacket portion 40a which together with the gasket core 31a are adapted to fit into a slot 47 provided in the spigot member 35a. Due to the slot 47 in the member 35a this is given a larger end diameter, and the socket end member 36a will therefore enter the spigot end member 35 with lesser play. However, the manner in which the sliding jacket 32a is displaced during the installation, will be similar to that of the gasket discussed in connection with FIGS. 4 and 5.

The intermediate portion 40a of FIG. 6 is given an approximate zig-zag shape, but still defines together with the top surface 42a of the core 31a a drop-shaped track 43a which in final assembled position of the gasket 30a, defines a concave gasket end surface similar to the surface 44 illustrated in FIG. 5.

Figure 7:
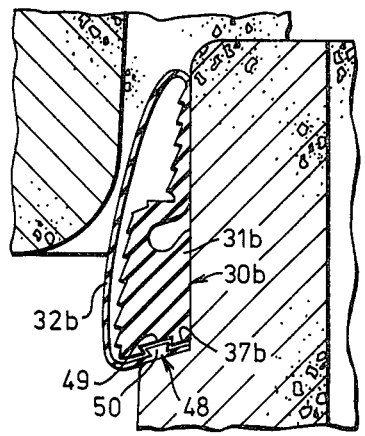
FIG. 7 is a section through a further variant of the embodiment illustrated in FIGS. 4 and 5.

In FIG. 7 there is illustrated a further variant of the gasket discussed in connection with FIGS. 4 and 5, the gasket 30b of FIG. 7 being provided with a sliding jacket 32b which joins the lower end surface of the gasket core 31b by a locking mechanism generally designated by 48. The locking mechanism 48 comprises on the one hand a dovetail-shaped slot 49 provided in the lower end surface 37b of the core 31b, and on the other hand a rib 50 provided on the sliding jacket and being adapted to fit snugly into the dovetail-slot 49.

It is to be understood that the sliding jacket may be attached to the core in other manners than that illustrated in the embodiment of FIG. 7. Of course, the sliding jacket may be formed integrally with the core, but it may also either at the one or both ends be attached to the core by gluing or welding or similar. It is further to be understood that such agencies for attaching the jacket to the core can also be used in connection with other embodiments of the gasket according to the invention.

Figure 8:
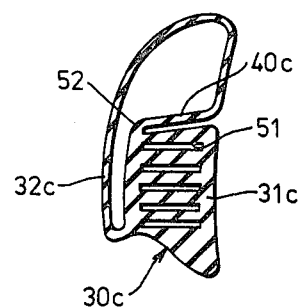
FIG. 8 illustrates a cross-section through a further embodiment of the gasket according to the invention.

In FIG. 8 there is illustrated a further embodiment of the gasket according to the invention, in which the very gasket 30c comprises a substantially rectangular core 31c, comprising a plurality of parallel slits or narrow slots 51. The intermediate jacket portion 40c is here provided as a substantially transversally extending top piece extending from the one top corner 52 of the core 31c and in the area of the second top corner of the core merging into the remaining jacket 32c.

Figure 9:
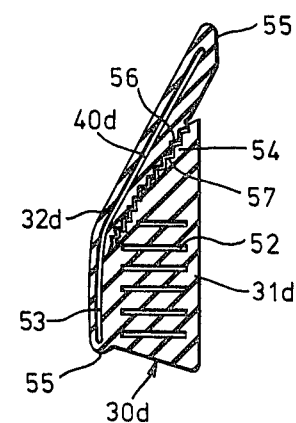
FIG. 9 is a cross-section through still another embodiment of the gasket according to the invention.

However, it is to be understood that the intermediate jacket portion may have an inclination relative to the gasket core or a portion thereof. Such an embodiment of a gasket according to the invention is illustrated in FIG. 9, in which the very gasket is designated by 30d, the core by 31d, and the sliding jacket generally designated by 32d. The core 31d is here provided with a plurality of slits 52, as well as a substantially vertical sliding portion 53 and an inclined furrowed braking portion 54.

The sliding jacket 32d extends from a lower corner 55 of the core 31d along the sliding portion 53 of the core and further along the inclined core portion 54 and beyond this, whereafter it via a folding portion 55 is folded back between the inclined braking portion 54 of the core and remaining portions of the very jacket to join the core at the upper edge of the sliding portion 53.

In the area in which the sliding jacket 32d extends along the inclined braking surface 54 of the core 31d, the jacket is similarly to the braking surface 54 provided with furrows 56 which engage opposite furrows 57 of the braking surface 54. Thus, the intermediate portion 40d of the sliding jacket 32d will during installation not slide along the furrowed braking surface 54, but roll off from the top of the surface 54, whereas the remaining portion of the sliding jacket 32d slides along the substantially vertical sliding surface 53 of the core 31d.

Such a gasket having an inclined core portion, is especially applicable in connection with joint members which aside from having an axial sealing surface, have an inclined sealing surface which merges into the axial sealing surface and in assembled position of the joint members are adapted to be in contact with the inclined core portion. The furrowed surface of the inclined core portion 54 will in assembled position of the joint members penetrate into the cavities of the inclined sealing surface of a first joint member which is threaded onto the joint member holding the gasket, whereas the intermediate portion 40d with its furrows 56 will penetrate into the cavities of the axial sealing surface of the first joint member. The intermediate jacket portion or portions discussed above may have the same thickness as the rest of the sliding jacket, but in many cases when the gasket is in its final assembled position, it may be desired to have a higher gasket compression pressure than the compression pressure provided by the gasket during the assembly of the two members to be joined, and then especially at the start of the assembly. In such cases an intermediate jacket portion and the passage from the core to the sliding jacket may be provided with a larger thickness than the rest of the sliding jacket, preferably increasing towards the core portion attachment point.

During the latter part of the assembly of the pipes this thicker portion will be pulled in between the core portion and the opposite sealing surface, so that the active sealing volume of the gasket increases.

It is to be understood that the gasket according to the invention may be used not only in connection with concrete pipes and basins, but also for joint members of other material, for example plastics, steel, iron, etc. It is further to be understood that the gasket not necessarily has to form closed loops, but can be used in arbitrarily cut lengths, for example as sealing means in hatches etc.

It is further to be understood that the gasket does not have to be mounted on the spigot end of the joint members to be put together, but can also be mounted in a slot in a joint socket.

What I claim is:

1. A gasket for resiliently deformable material, for forming a seal between respective first and second sealing surfaces of two members by anchoring the gasket to the sealing surface of one of said members and then relatively moving said sealing surfaces through a predetermined distance and in a predetermined direction substantially parallel to each other so as to squeeze the gasket therebetween, said gasket comprising:
   (i) a resiliently deformable core portion having ends spaced in said direction,
   (ii) a jacket portion which is relatively thinner than said core portion and which extends from said core portion so as to bound with a part of the surface of said core portion, a closed chamber containing a lubricant, said jacket in its unconstrained state projecting from one end of said core portion substantially along said predetermined direction and for at least said predetermined distance, whereby upon effecting said relative movement of said sealing surfaces, with said gasket disposed therebetween and said core portion anchored to one of said sealing surfaces, said jacket portion may be entrained by the other of said sealing surfaces and slide with the aid of said lubricant along said part of the surface of the core until said jacket extends from the other end of said core portion.

2. A gasket, as claimed in claim 1, wherein said jacket portion protrudes from said first end of said core at a first corner thereof and protrudes from said second end of said core portion at a second corner thereof disposed approximately diagonally opposite to said first corner thereof.

3. A gasket, as claimed in claim 2, wherein a part of the jacket which protrudes from said first corner is of thicker material than the remainder of the jacket.

4. A gasket, as claimed in claim 1, wherein said part of the surface of the core, and the inner surface of the jacket bounding said closed chamber, are smooth surfaces.

5. A gasket of resiliently deformable material comprising a deformable core portion and a jacket portion which is relatively thinner than said core portion and which extends from said core portion so as to bound, with a part of the surface of said core portion, a closed chamber containing a lubricant.

* * * * *